United States Patent [19]

Fukumura et al.

[11] Patent Number: 5,026,323

[45] Date of Patent: Jun. 25, 1991

[54] STRUCTURE FOR MOUNTING BOOT

[75] Inventors: Yoshikazu Fukumura; Toshiyuki Ohki, both of Iwata, Japan

[73] Assignee: NTN Corporation, Osaka, Japan

[21] Appl. No.: 559,801

[22] Filed: Jul. 30, 1990

[30] Foreign Application Priority Data

Aug. 28, 1989 [JP] Japan .................................. 1-100570

[51] Int. Cl.⁵ .................................................. F16D 3/84
[52] U.S. Cl. .................................. 464/175; 277/212 FB
[58] Field of Search ....................... 464/173, 174, 175; 277/212 FB

[56] References Cited

U.S. PATENT DOCUMENTS

| 4,224,808 | 9/1980 | Gehrke | 464/175 |
| 4,558,869 | 12/1985 | Grove et al. | 464/175 X |
| 4,559,025 | 12/1985 | Dore | 464/175 |
| 4,786,272 | 11/1988 | Baker | 464/175 |
| 4,936,811 | 6/1990 | Baker | 277/212 FB X |

Primary Examiner—Thomas R. Hannon
Attorney, Agent, or Firm—Armstrong, Nikaido, Marmelstein, Kubovcik & Murray

[57] ABSTRACT

A structure for mounting a boot for a homokinetic joint. The boot is mounted between an outer ring of the joint and a shaft with both ends thereof engaging the outer peripheries of the outer ring and the shaft. Fastening bands are put on the engaging portions. Further, rubber rings are fitted on the outer peripheries of the outer ring and the shaft. The boot is formed in both end portions thereof with a predetermined number of slits axially extending from its ends inwardly. The rubber rings are provided with protrusions adapted to engage both ends of the boot, which is engaged in a groove formed in the outer ring and the shaft.

5 Claims, 4 Drawing Sheets

STRUCTURE FOR MOUNTING BOOT

The present invention relates to a structure for mounting a boot for a homokinetic joint.

FIG. 10 shows a known structure for mounting a bellowslike boot between an outer ring of a homokinetic joint and a transmission shaft. A boot 20 is formed on its inner peripheral surface at both ends thereof with ribs 21 adapted to be received in grooves 24 formed in an outer ring 22 of a homokinetic joint and a shaft 23, and bands 25 are used to tighten the boot (Japanese Unexamined Utility Model Publications 59-189963 and 59-163228). The boot having the above structure is normally made of chloroprene rubber.

For better durability of the boot 20, it may be made of polyester elastomer by blow molding. In this case, it is difficult to integrally form such high ribs 21 as shown in FIG. 10 on the inner peripheral surface of the boot 20. Even if such ribs can be formed, it will be impossible to expand their diameter because the material is very hard. Thus it will become extremely difficult to set them in the groove 24 formed in the shaft 23. Therefore, as shown in FIG. 11, it will become necessary to employ a special structure for the outer ring 22 and the shaft 23. Namely, since the abovementioned resin is low in the bending fatigue strength against tension, it is necessary to provide the outer ring 22 with a step 26 (FIG. 12) and press the tip of the boot 20 against it to keep the boot in a compressed state. Also, in order to keep high sealing properties, it is necessary to form ribs 27 on the outer peripheral surface of the outer ring 22. (FIG. 12) Since the shaft 23 cannot be fitted elastically as with the chloroprene rubber boot, it has to be designed to have a very large diameter. Further it is necessary to form ribs 28 for sealing (FIG. 13).

Such a special provision will result in increase in the cost and weight of the homokinetic joint and the shaft. Further it was necessary to take special care to assure sealing properties when assembling.

It is an object of the present invention to provide, for a boot made of a hard synthetic resin such as polyester elastomer, a mounting structure which is applicable to a homokinetic joint and a shaft of a standard design and which has high sealing properties and which allows easy assembly.

In accordance with the present invention, rubber rings adapted to engage the boot are mounted on the outer ring and the shaft. The boot is made of a polyester elastomer and has both ends thereof adapted to engage the rubber rings, and is formed in both end portions thereof with a plurality of slits axially inwardly extending from its ends. Bands are put around both end portions of the boot to fasten the boot in position.

According to the present invention, the synthetic resin boot is fitted through the rubber rings. The protrusions formed on the rubber rings serve to engage both ends of the boot. Thus the boot is only provided with the slit to deform its open end and with the engaging portions to engage the rubber rings. Since the boot has no inwardly protruding portions on its inner peripheral surface, it can be formed easily. Further, since the boot is mounted around the rubber rings so as to engage the protrusions formed on the rubber rings, the boot is reliably prevented from moving circumferentially and axially and has better sealing properties. Moreover, the outer ring and the shaft may be of a standard design and can be assembled easily.

The bent portion provided at the outer end of each rubber ring serves to further facilitate assembly.

Other features and objects of the present invention will become apparent from the following description taken with reference to the accompanying drawings, in which.

Figure 1:
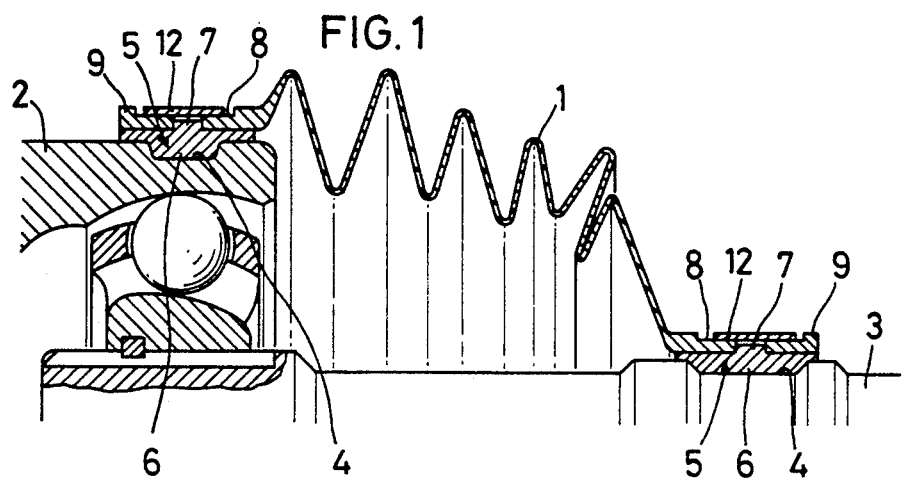
FIG. 1 is a partially omitted sectional view of the first embodiment.
Figure 2:
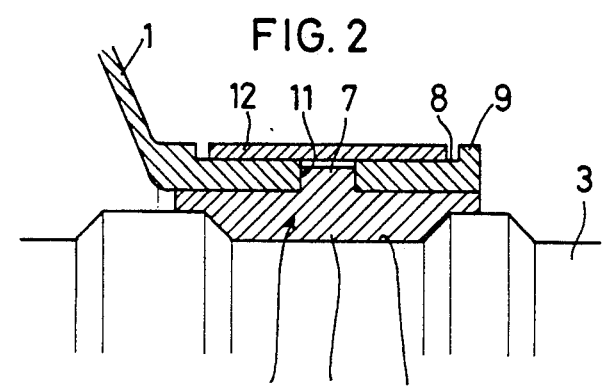
FIG. 2 is an enlarged sectional view of a portion of the same.
Figure 3:
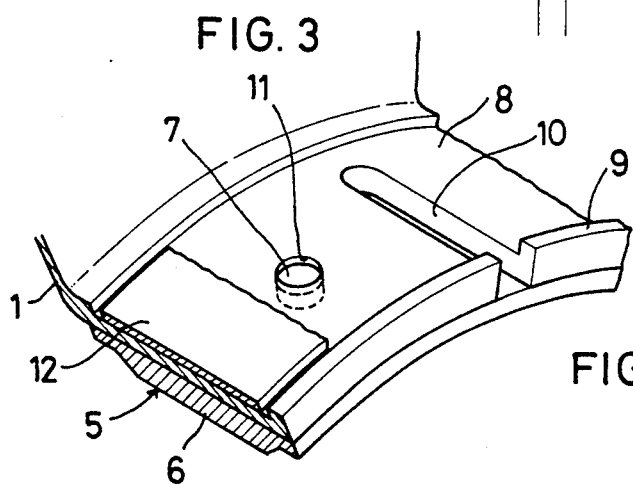
FIG. 3 is a perspective view of a portion of the same.

FIGS. 1–3 show the first embodiment in which a boot 1 is made of polyester elastomer by blow molding. An outer ring 2 and a shaft 3 are of a standard design as in the case where a prior art chloroprene rubber boot is used. They are formed in their outer peripheral surfaces with annular grooves 4.

A rubber ring 5 is fitted in each groove 4. It is made of chloroprene rubber or silicone rubber and formed on its inner peripheral surface with a rib 6 adapted to fit in the groove 4. Further it is integrally formed on its outer peripheral surface with a plurality of protrusions 7 at predetermined angular spacings.

The boot 1 is formed on its outer peripheral surface at each end thereof with a groove 8 for band and is formed with a rib 9 at both ends thereof. Further it is formed in both ends thereof with a plurality of slits 10 axially extending across the rib 9 and substantially the whole width of the groove 8 and arranged at predetermined spacings. (FIG. 3) The slits 10 are provided to facilitate deformation of the boot 1 at both ends thereof. Also, the boot 1 is formed in both ends with holes 11 so as to receive the protrusions 7 on the rubber ring 5. In mounting the boot 1, its both ends are deformed to fit the protrusions 7 on the rubber rings 5 in the holes 11 formed in the boot 1. Then a band 12 is fitted in each groove 8 to tighten the boot 1 in position.

Figure 4:
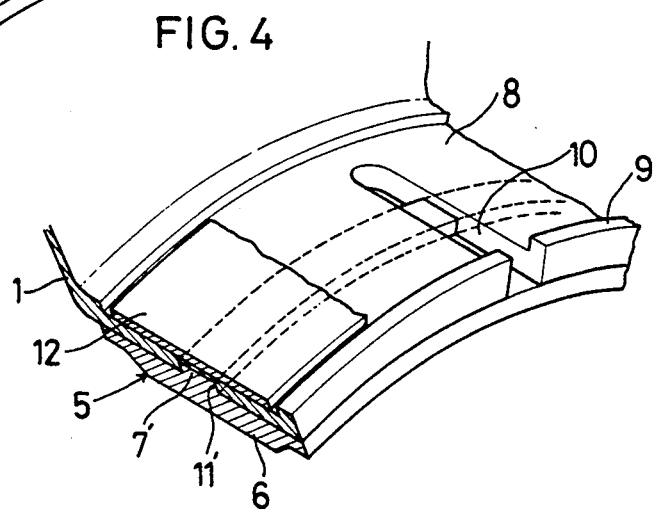
FIG. 4 is a perspective view of a portion of a version of the first embodiment.

In place of the structure comprising the protrusions 7 and the holes 11, as shown in FIG. 4, a rib 7' may be formed on the outer peripheral surface of each rubber ring 5 to extend over its entire periphery while forming a groove 11'. in the inner peripheral surface of the end portion of the boot 1 so that the rib 7' will fit in the groove 11'.

Figure 5:
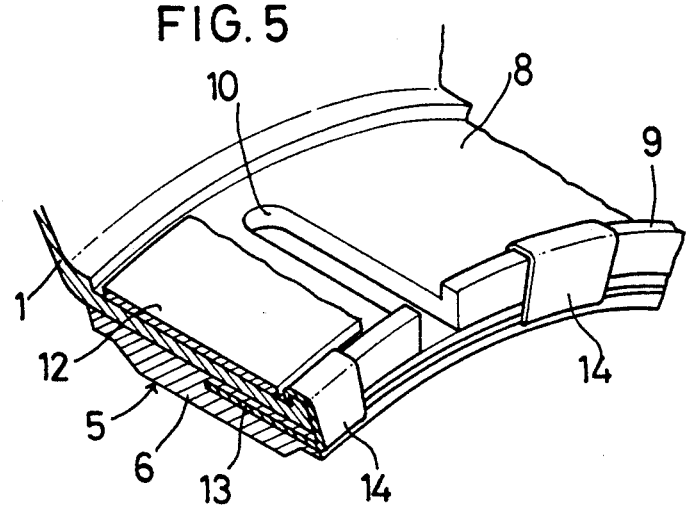
FIG. 5 is a perspective view of a portion of the second embodiment.

In the second embodiment shown in FIG. 5, a ring-shaped iron plate 13 is embedded in each rubber ring 5. It has a plurality of claw-like protrusions 14 extending upright from its inner peripheral edge and caulked against the ribs 9 on the boot 1 to fix the plate 13 in position. This embodiment is the same as the above-described embodiment in that the boot 1 is formed with the slits 10 and that the bands 12 are fitted in the grooves 8.

Figure 6:
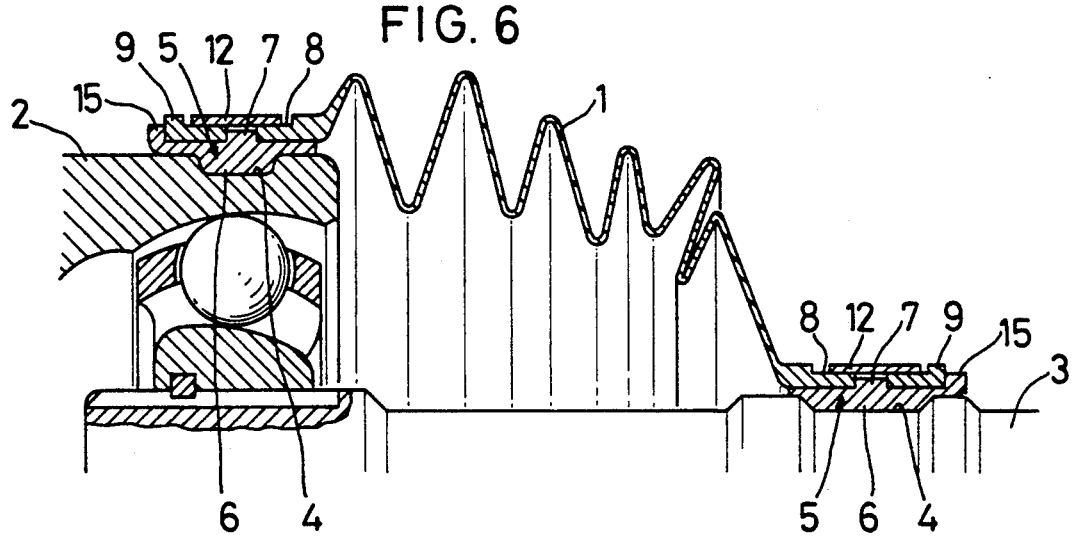
FIG. 6 is a partially omitted sectional view of the third embodiment.
Figure 7:
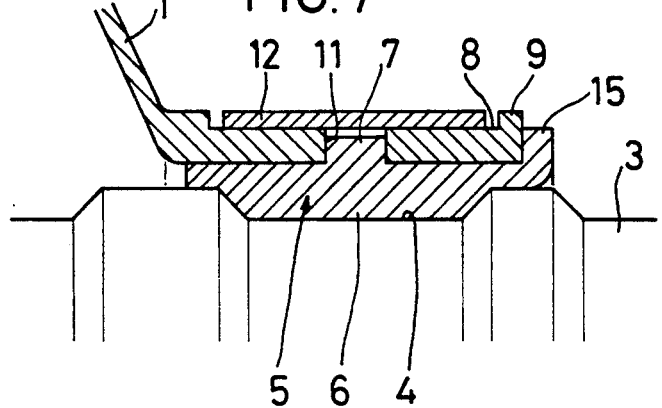
FIG. 7 is an enlarged sectional view of a portion of the same.
Figure 8:
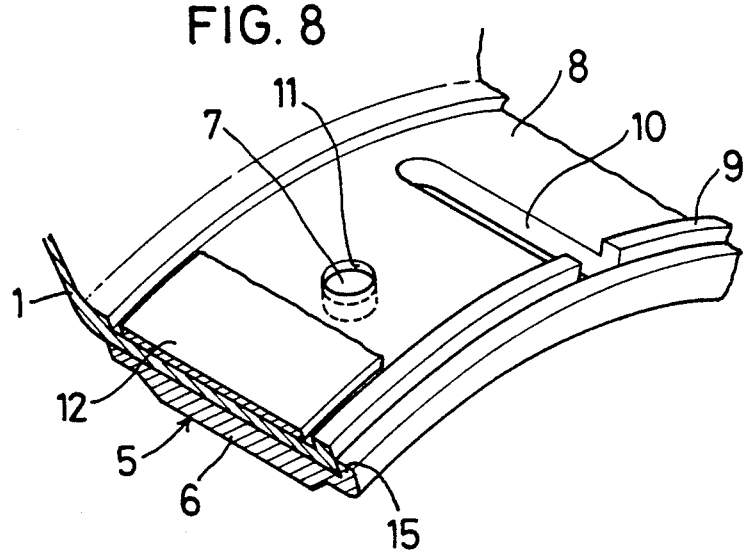
FIG. 8 is a perspective view of a portion of the same.

FIGS. 6–8 show the third embodiment in which each rubber ring 5 is formed along its outer edge with a bent portion 15 extending upright so as to extend along the end face of the boot 1. Otherwise this embodiment is the same in structure as the first embodiment. The bent portions 15 serve the following purposes.

Figure 9:
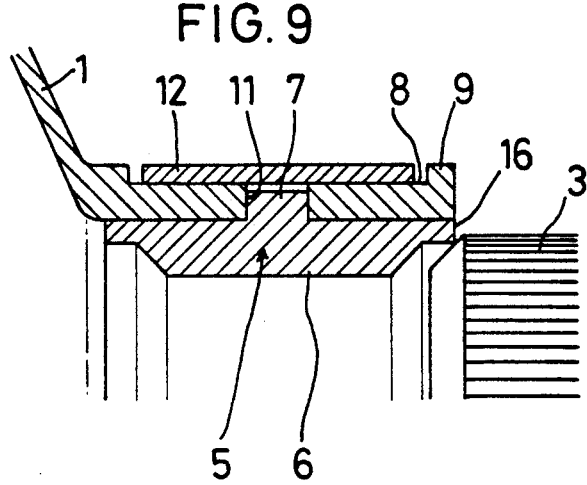
FIG. 9 is a partially omitted sectional view of the first embodiment showing the state when it is inserted.
Figure 10:
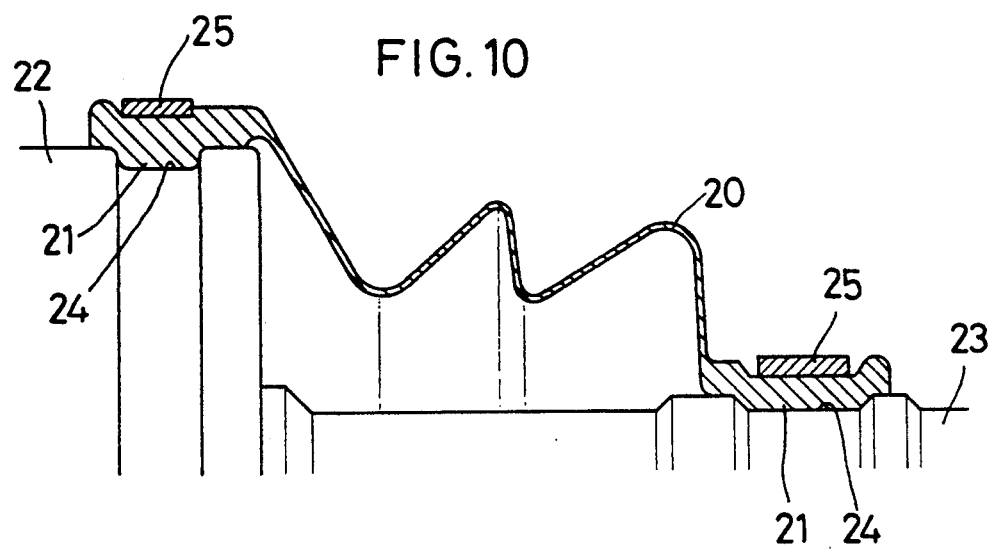
FIG. 10 is a sectional view of a prior art example.
Figure 11:
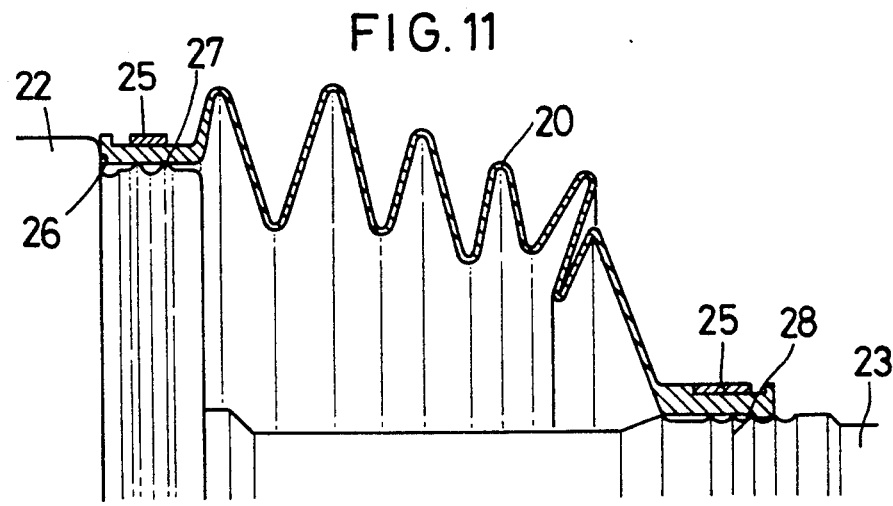
FIG. 11 is a sectional view of another prior art example.
Figure 12:
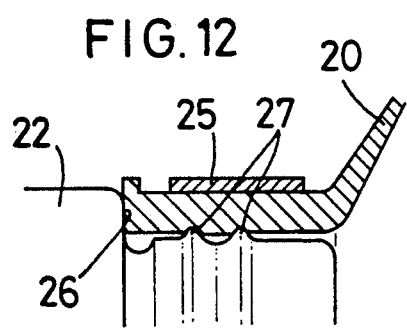
FIGS. 12 and 13 are enlarged sectional views of portions of FIG. 11.
Figure 13:
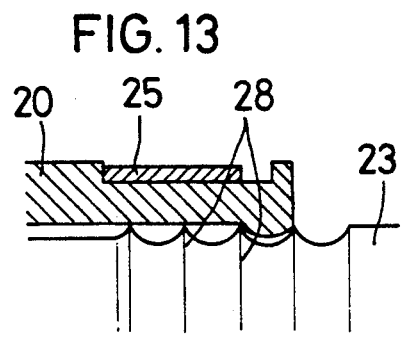

Namely, in mounting the boot 1 of the first embodiment having no bent portions 15 on the outer ring 2 or the shaft 3, as shown in FIG. 9, the rubber rings 5 come into abutment at their outer end face 16 with the corner of the shaft 3 or the outer ring 2. Thus they get partially deformed. This will make the insertion of the boot 1 extremely difficult.

In contrast, by the provision of the bent portions 15 as in the third embodiment, the rubber rings 5 will have higher rigidity at their outer edge and thus become less liable to deformation. This will make the insertion of the boot 1 easier.

In the above embodiments, the boot 1 is formed at both ends thereof with a predetermined number of slits 10 extending axially from its open ends inwardly to facilitate assembly. But if the bent portions 15 are provided along the outer edge of the rubber rings 5, the slits 10 may be omitted or provided in a smaller number because the bent portions 15 facilitate assembly.

What is claimed is:

1. A structure for mounting a boot for a homokinetic joint on an outer ring of the homokinetic joint and a shaft, the structure comprising rubber rings mounted on said outer ring and said shaft and having engaging means for engagement with said boot, said boot made of a polyester elastomer having both ends thereof adapted for engagement with said engaging means on said rubber rings, said boot being formed in both end portions thereof with a plurality of slits axially inwardly extending from its ends, and bands put around both end portions of said boot for fastening said boot in position.

2. A structure as claimed in claim 1, wherein said engaging means are protrusions integrally formed on the outer peripheral surface of said rubber rings so as to be received in holes formed in said boot.

3. A structure as claimed in claim 1, wherein said engaging means is a rib integrally formed on the outer peripheral surface of said rubber rings so as to be received in a groove formed in said boot.

4. A structure as claimed in claim 1, wherein said engaging means are metal plates embedded in said rubber rings and having claw-like protrusions extending upright from an outer end thereof, said protrusions being shaped for engagement with said boot.

5. A structure as claimed in claim 1 or 2, wherein said rubber rings are formed at outer end thereof with bent portions extending upright for engagement with both end faces of said boot.

* * * * *